(12) United States Patent
Deane

(10) Patent No.: US 6,757,043 B2
(45) Date of Patent: Jun. 29, 2004

(54) ACTIVE MATRIX DEVICES

(75) Inventor: Steven C. Deane, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/014,259

(22) Filed: Dec. 11, 2001

(65) Prior Publication Data
US 2002/0075440 A1 Jun. 20, 2002

(30) Foreign Application Priority Data
Dec. 20, 2000 (GB) .............................. 0031039

(51) Int. Cl.$^7$ ............................................ G02F 1/1333
(52) U.S. Cl. ..................... 349/149; 349/139; 349/58; 349/145; 349/158
(58) Field of Search .................. 349/58, 145, 149, 349/139, FOR 113, FOR 125, 146, 151, 160, 158, FOR 124, 84, 187

(56) References Cited

U.S. PATENT DOCUMENTS

| 5,130,829 A | | 7/1992 | Shannon ................. 359/59 |
| 5,680,192 A | * | 10/1997 | Burrell et al. ............ 349/152 |
| 5,889,568 A | | 3/1999 | Seraphim et al. ........... 349/73 |
| 6,066,018 A | * | 5/2000 | Grupp et al. .............. 445/25 |
| 6,275,277 B1 | * | 8/2001 | Walker et al. ............. 349/113 |
| 6,496,238 B1 | * | 12/2002 | Greene et al. ............. 349/73 |

FOREIGN PATENT DOCUMENTS

| JP | 55075679 A | * | 6/1980 | .......... G04G/01/00 |
| JP | 08234237 | | 9/1996 | .......... G02F/1/136 |
| JP | 200009830 | | 4/2000 | .......... G09F/9/30 |
| WO | WO9919765 | | 4/1999 | .......... G02F/1/1333 |

OTHER PUBLICATIONS

"Manufacturing of Large Wide–View Angle Seamless Tiled AMLCDs for Business and Consumer Applications" by R.G. Greene et al, pp. 191–194 of the Proceedings of the IDMC 2000 Conference in Seoul, Korea in Sep. 2000.

* cited by examiner

Primary Examiner—Jerome Jackson
Assistant Examiner—Matthew Landau

(57) ABSTRACT

An active matrix device comprises a supporting plate (20), an array of control elements (6), a set of row address conductors (26) on the plate for addressing the array to which selection signals are applied by a row driver circuit (22), and a set of column address conductors (12) on the plate to which data signals are applied by a column driver circuit (22) for conduction to the array. Connection from the respective driver circuits (22) to at least some of both sets of address conductors is via the same side of the array, the profile of the plate around the other sides of the array being non-rectangular. Greater flexibility in the design of such devices is thus provided.

16 Claims, 3 Drawing Sheets

ACTIVE MATRIX DEVICES

This invention relates to active matrix devices and more particularly, but not exclusively, to active matrix liquid crystal displays (AMLCDs).

Active matrix devices, such as AMLCDs, are used in an increasingly wide variety of products, including consumer electronics, computers and communication devices. The structure of an AMLCD is described for example in U.S. Pat. No. 5,130,829 (our ref PHB 33646), the contents of which are incorporated herein as reference material. Active matrix devices are often included in portable products where the size and compactness of the device are particularly important considerations.

AMLCDs comprise a rectangular array of pixel elements addressed by means of row and column electrodes. The row electrodes are driven with row selection signals generated by a row driver circuit, while the column electrodes carry video information generated by a column driver circuit. Each pixel element includes a control element, such as a thin film transistor, connected to a row electrode and a column electrode. The row and column driver circuits are arranged adjacent respective perpendicular edges of the display.

The use of single-sided AMLCD addressing in rectangular tiled displays is described in "Manufacturing of Large Wide-View Angle Seamless Tiled AMLCDs for Business and Consumer Applications" by R. G. Greene et al, pp191–4 of the Proceedings of the IDMC 2000 Conference in Seoul, Korea in September 2000.

The present invention provides an active matrix device comprising a supporting plate, an array of control elements, a set of row address conductors on the plate for addressing the array to which selection signals are applied by a row driver circuit, and a set of column address conductors on the plate to which data signals are applied by a column driver circuit for conduction to the array, wherein connection from the respective driver circuits to at least some of both sets of address conductors is via the same side of the array, the profile of the plate around the other sides of the array being non-rectangular.

In the existing AMLCD configuration described in U.S. Pat. No. 5,130,829 as referred to above, the screen is rectangular as connections to the row and column address conductors must be disposed along orthogonal edges of the active matrix. This restricts the design freedom of product manufacturers, particularly for relatively small products, as the choice of screen shapes available is limited and also space must be provided around the border of the screen on two orthogonal sides to accommodate the driver circuits and connections thereto from the screen.

Connection to at least some of both row and column address conductors of an active matrix device of the invention is via the same side of the matrix. Thus the space occupied on the other sides of the matrix by connectors and/or driver circuits can be substantially reduced or eliminated, allowing much greater flexibility in designing a product including such a device. Furthermore, non-rectangular devices can be fabricated, without requiring a large border area, as the device shape is not constrained by the need to have driver connections along two orthogonal sides. The use of single-sided addressing may also enable the total border area occupied by connectors and/or driver circuits to be reduced, enabling the overall size of a product to be smaller. This is especially desirable in portable products such as mobile telephones or personal digital assistants (PDAs) for example.

Connection from the row driver circuit to the row address conductors may be via respective connectors which are substantially parallel to the column address conductors within the array area. Alternatively, connection from the column driver circuit to the column address conductors is via respective connectors which are substantially parallel to the row address conductors within the array area.

Depending on the shape of the array, connection to some or all of both sets of address conductors is via the same side of the array. For example, if the side of the array adjacent the driver circuits is curved, it may be preferable to connect directly to all of the column conductors and the closest row conductors via the edge of the array, with additional connectors which extend substantially parallel to the column conductors within the array area being provided for connection to the remaining row conductors. Alternatively, connection to all the address conductors may be via the side of the array adjacent the driver circuits.

The profile of the plate may be substantially symmetrical about an axis, or about perpendicular axes. For example, an ellipsoid or oval shape may be desirable in some circumstances. Furthermore, the array of control elements may be non-rectangular. Preferably, the array is substantially symmetrical about an axis, or substantially symmetrical about perpendicular axes.

Preferably, the active matrix device forms part of a liquid crystal display. In particular, it may be a reflective or transflective type of display. In these configurations, the introduction of the additional connectors to the row or column address conductors need not reduce the aperture of the pixels, as they may be obscured by the reflective part of each pixel.

The invention further provides a method of constructing an active matrix device comprising cutting a pre-formed active matrix device, the pre-formed device comprising a supporting plate, an array of control elements, a set of row address conductors on the plate for addressing the array to which selection signals are applied by a row driver circuit, and a set of column address conductors on the plate to which data signals are applied by a column driver circuit for conduction to the array, wherein connection from the respective driver circuits to at least some of both sets of address conductors is via the same side of the array, the cutting step resulting in the profile of the plate around the other sides of the array being non-rectangular. Thus, devices may be manufactured from a stock of standard blanks and shaped individually as appropriate.

A laser may be used in the cutting step. In an AMLCD, the plate (and a second plate spaced therefrom) is typically formed of glass, which can be reliably fractured along straight lines using a "scribe and break" technique. However, more complex and/or curved shapes may be more readily cut in glass and other suitable plate materials by utilising laser scribing.

Prior art configurations and embodiments of the invention will now be described by way of example and with reference to the accompanying schematic drawings, wherein.

Figure 1:
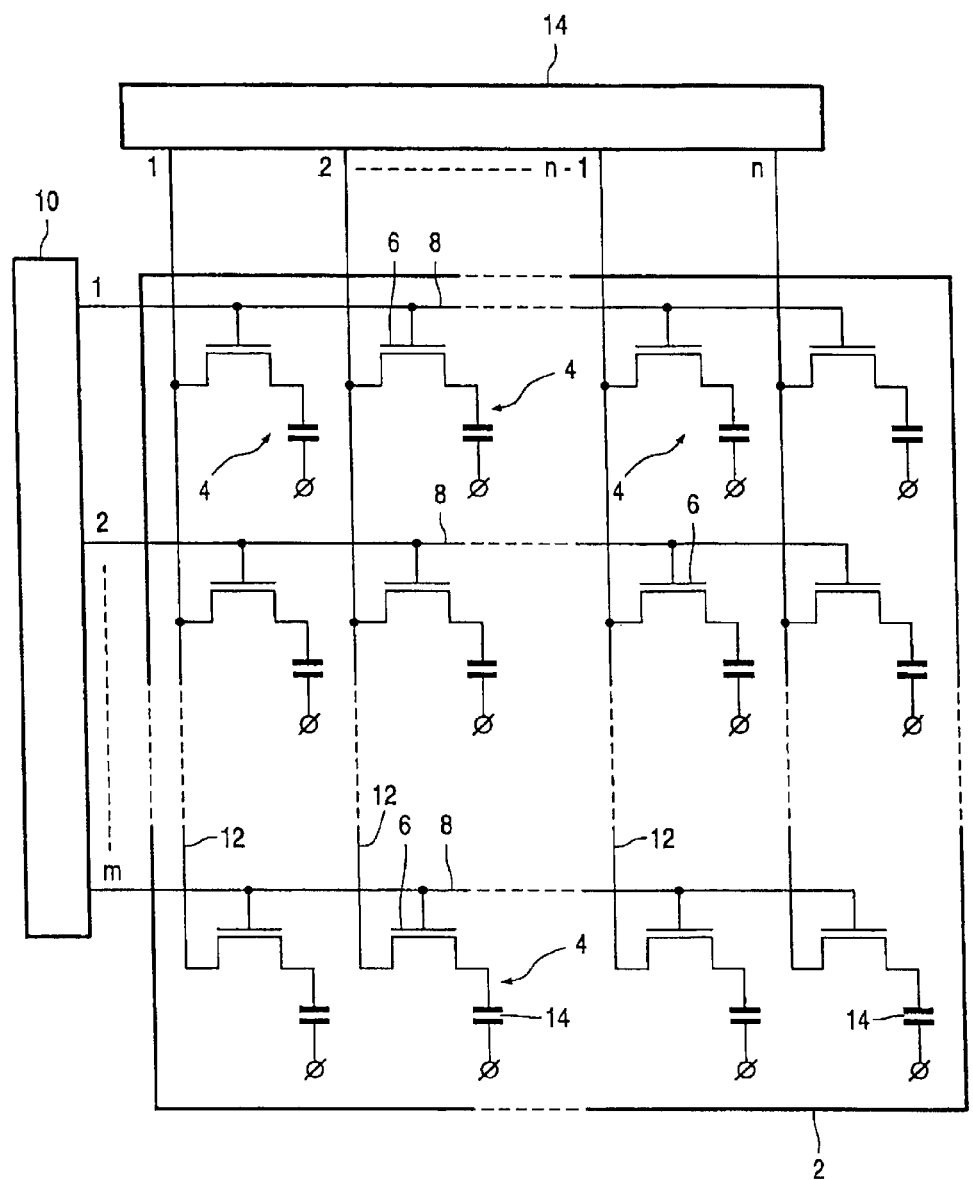
FIG. 1 shows a circuit diagram of a known active matrix liquid crystal display device.

FIG. 1 illustrates schematically a known active matrix display device configuration. It comprises a display panel 2 which includes two rectangular spaced supporting plates. Liquid crystal is disposed between the plates. An array of picture elements 4 is provided on one of the plates, consisting of m rows (1 to m) with n picture elements 4 (1 to n) in each row. For clarity, only a few picture elements are shown.

Each picture element 4 is associated with a respective switching element 6 in the form of a thin film transistor (TFT) 6. The gate terminals of all the TFTs 6 associated with picture elements in the same row are connected to a common row conductor 8 to which, in operation, gating signals are applied by a row driver circuit 10. The source terminals of the TFTs associated with picture elements in the same column are connected to a common column conductor 12 to which data signals are applied in use. The drain terminals of the TFTs are connected to respective transparent picture element electrodes 14. The conductors 8 and 12, the TFTs 6, and the electrodes 14 are carried on the one plate, while the other plate carries an electrode common to all the picture elements. The operation of such a display device is well known and will not therefore be discussed here.

Figure 2:
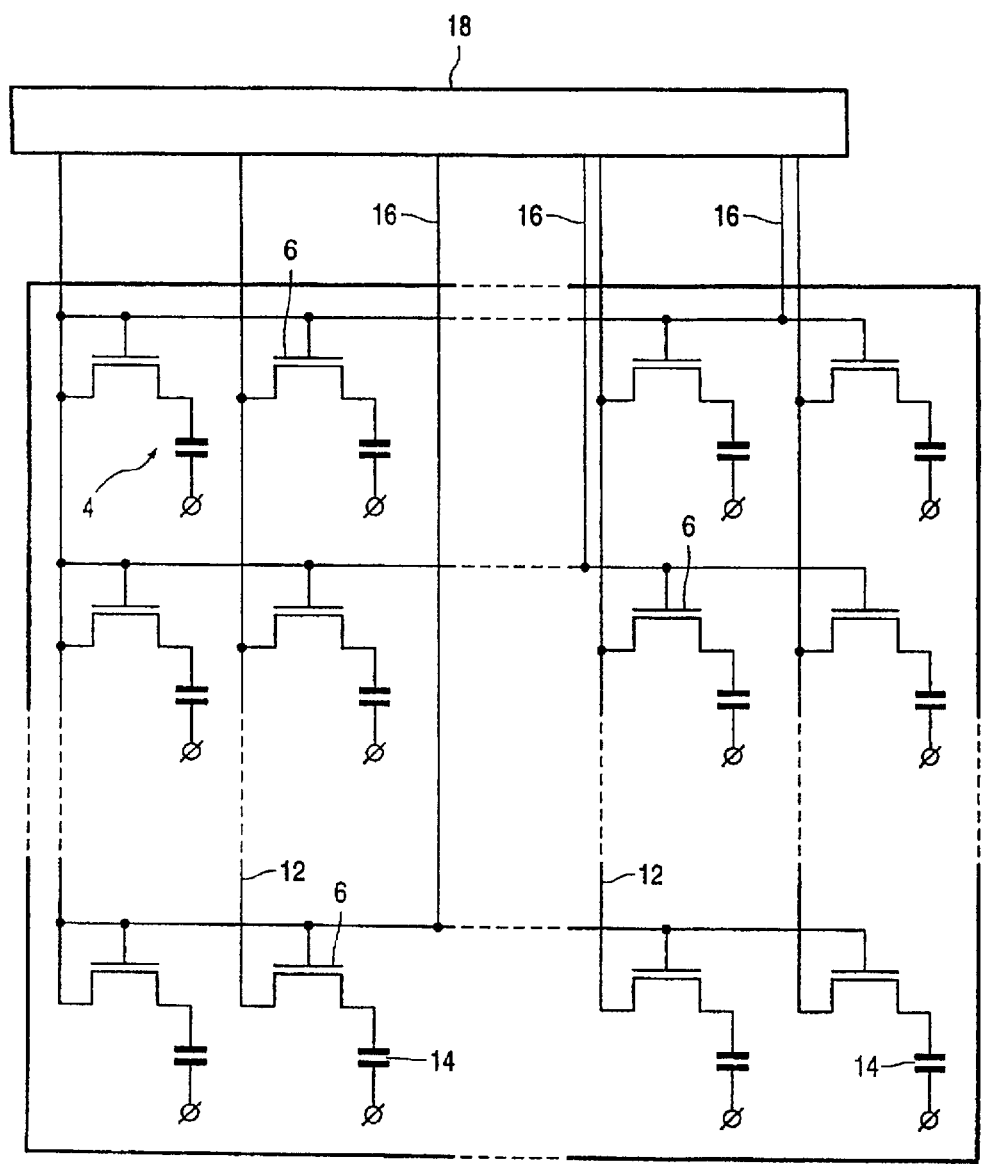
FIG. 2 shows a circuit diagram of an active matrix liquid crystal display device including single-sided addressing.

An active matrix liquid crystal display device including single-sided addressing is shown in FIG. 2. In contrast to FIG. 1, the row conductors 8 are connected to a row and column driver circuit 18 disposed on one side of the display via additional connectors 16. These connectors run substantially parallel to the column conductors 12 and connect to respective row conductors at their crossing points.

Figure 3:
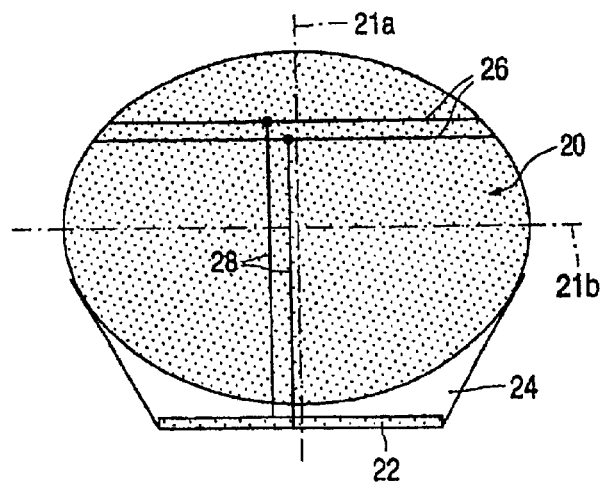
FIG. 3 shows a display device according to a first embodiment of the invention.

An embodiment of the present invention is shown in FIG. 3. It comprises an oval addressed display area defined by two oval supporting plates 20, which is connected via single-sided addressing to a row and column driver circuit 22. It will be appreciated that the plates and the display area of the active array are symmetrical about two mutually perpendicular axes 21a and 21b. To reduce further the border area of the display which is occupied by the driver circuit and connections thereto from the display area, the connections converge from the edge of the display towards the driver circuit over a "fan in" area 24. Two of the row conductors 26 and their associated, substantially perpendicular connectors 28 to the driver circuit are shown by way of illustration. For the purposes of clarity, other features of the active matrix array are omitted from FIG. 3, such as the column address conductors perpendicular to the row conductors 26, and the picture elements. In an alternative embodiment to that of FIG. 3, single-sided addressing may be implemented by providing additional normal connectors to the column address conductors, such that the array is addressed via a side disposed transversely relative to the column conductors, rather than addressing the column conductors via their ends.

The driver circuit 22 may be connected to the display area using a flexfoil attached to contacts on one of the two oval supporting plates 20. Alternatively, in an amorphous silicon-based AMLCD, silicon integrated circuits forming the driver circuit may be mounted on one of the supporting plates which may be formed such that it extends beyond the oval display area, with the connectors of fan in area 24 also being provided on the plate. If the AMLCD is fabricated using polysilicon technology, the driver circuits may be formed on the same plate as the TFTs of the active matrix and simultaneously therewith.

Figure 4A:
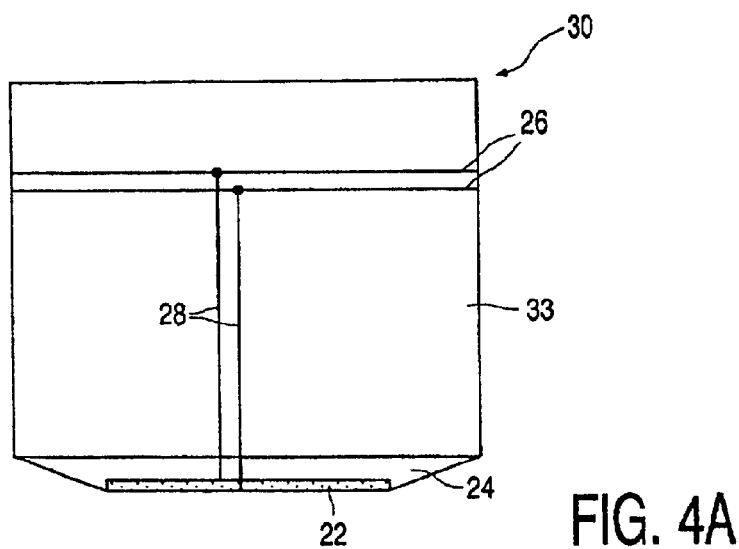
FIG. 4A shows a rectangular blank for use in fabricating a display device according to a second embodiment of the invention.
Figure 4B:
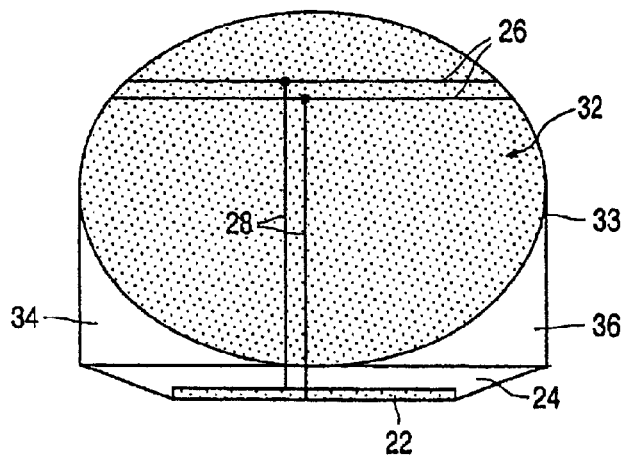
FIG. 4B shows the second embodiment of the invention as formed from the blank of FIG. 4A.

FIG. 4A shows a rectangular "blank" AMLCD 30 for subsequent cutting to suit particular requirements. It is similar to the configuration shown in FIG. 3, except that the active matrix array of picture elements is rectangular. Other "blank" configurations and formats may be adopted. Laser scribing may be used for example to shape the display. Such a modified display is illustrated in FIG. 4B. As in the embodiment of FIG. 3, an oval display area 32 (shaded) is provided between two supporting plates 33. This is achieved by removing two portions from the side of the blank opposite to the driver circuit 22. In the finished product, the unused display portions 34 and 36 adjacent the driver circuit may be hidden such that only the oval display area 32 is visible. Single-sided addressing enables a large proportion of the blank profile to be modified without impeding the addressing of the remaining matrix.

The configuration of FIG. 3 may require the use of a custom mask set for formation of the active matrix and/or fan in connectors and/or drive circuit to suit a particular display area shape. This enables the border area around the display to be substantially minimised. It will be appreciated that the approach illustrated in FIG. 3 is suitable for high volume production, whilst that of FIGS. 4A and 4B is particularly suited to lower volume production of batches of displays to meet different requirements.

From reading the present disclosure, other variations and modifications will be apparent to persons skilled in the art. Such variations and modifications may involve equivalent and other features which are already known in the design, manufacture and use of electronic devices comprising active matrices, and component parts thereof, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any Claim and whether or not it mitigates any or all of the same technical problems as does the present invention. Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

What is claimed is:

1. An active matrix device comprising a supporting plate, a non-rectangular array of control elements, a set of row address conductors on the plate for addressing the array to which selection signals are applied by a row driver circuit, and a set of column address conductors on the plate to which data signals are applied by a column driver circuit for conduction to the array, wherein connection from the respective driver circuits to at least some of both sets of address conductors is via a same side of the plate, and wherein the profile of the plate is non-rectangular.

2. A device of claim 1 wherein connection from the row driver circuit to the row address conductors is via respective connectors which are substantially parallel to the column address conductors within an area of the array.

3. A device of claim 1 wherein connection from the column driver circuit to the column address conductors is via respective connectors which are substantially parallel to the row address conductors within an area of the array.

4. A device of claim 1 wherein the profile of the plate is substantially symmetrical about an axis.

5. A device of claim 4 wherein the profile of the plate is substantially symmetrical about perpendicular axes.

6. A device of claim 1 wherein the array is substantially symmetrical about an axis.

7. A device of claim 6 wherein the array is substantially symmetrical about perpendicular axes.

8. The active matrix device of claim 1, wherein the connectors and column address conductors converge from an edge of the array toward the row and column driver circuits over a fan-out area.

9. The active matrix device of claim 1, wherein the array has an oval shape.

10. A liquid crystal display including an active matrix device, the active matrix device comprising
   a supporting plate,
   a non-rectangular array of control elements,
   a set of row address conductors on the plate for addressing the array to which selection signals are applied by a row driver circuit, and
   a set of column address conductors on the plate to which data signals are applied by a column driver circuit for conduction to the array,
   wherein connection from the respective driver circuits to at least some of both sets of address conductors is via the same side of the plate, and
   wherein the profile of the plate is non-rectangular.

11. A display of claim 10 wherein the display is reflective or transflective.

12. The liquid crystal display of claims 10, wherein the connectors and column address conductors converge from an edge of the array toward the row and column driver circuits over a fan-out area.

13. The liquid crystal display of claims 10, wherein the array has an oval shape.

14. A method of constructing an active matrix device comprising shaping a pre-formed active matrix device, the pre-formed device comprising a supporting plate, an array of picture elements, a set of row address conductors on the plate for addressing the array to which selection signals are applied by a row driver circuit, and a set of column address conductors on the plate to which data signals are applied by a column driver circuit for conduction to the array, wherein connection from the respective driver circuits to at least some of both sets of address conductors is via a same side of the plate, and
   wherein the shaping results in the profiles of both the array and the plate being non-rectangular.

15. The method of claim 14, wherein the shaping includes cutting the pre-formed active matrix device.

16. A method of claim 15 wherein a laser is used in performing the cutting step.

* * * * *